United States Patent

[11] 3,607,915

| [72] | Inventors | Albertus C. H. Borsboom;<br>Pieter A. Gautier; Dirk Medema, all of<br>Amsterdam, Netherlands |
|---|---|---|
| [21] | Appl. No. | 719,714 |
| [22] | Filed | Apr. 8, 1968 |
| [45] | Patented | Sept. 21, 1971 |
| [73] | Assignee | Shell Oil Company<br>New York, N.Y. |
| [32] | Priority | Apr. 27, 1967 |
| [33] | | Great Britain |
| [31] | | 19376/67 |

[54] CONTINUOUS CATALYST REACTIVATION IN CARBOXYLIC ACID VINYLATION
6 Claims, No Drawings

[52] U.S. Cl............................................. 260/498,
252/413, 260/410.9, 260/533
[51] Int. Cl............................................. C07c 67/04
[50] Field of Search............................ 260/498;
252/413

[56] References Cited
UNITED STATES PATENTS

| 2,715,140 | 8/1955 | Vining............................ | 260/498 |
| 3,346,627 | 10/1967 | Roscher et al.................. | 260/498 |
| 3,455,998 | 7/1969 | Arpe.............................. | 260/498 |

*Primary Examiner*—James A. Patten
*Assistant Examiner*—Vivian Garner
*Attorneys*—E. Walter Mark and John H. Colvin

ABSTRACT: A continuous process for producing vinyl carboxylates by reacting acetylene with carboxylic acids in the presence of a catalyst-containing reaction medium wherein catalyst is continuously reactivated by direct contact of a portion of reaction medium with the acid charge.

CONTINUOUS CATALYST REACTIVATION IN CARBOXYLIC ACID VINYLATION

The present invention relates to an improved process for the continuous, liquid-phase production of vinyl esters of carboxylic acids.

A process for the reaction of carboxylic acids with acetylene, in the liquid phase, in the presence of a carboxylic acid salt of zinc or cadmium is described in U.S. Pat. No. 2,066,075 - Reppe. Vinylation of carboxylic acids in vapor phase has also been disclosed heretofore, for example, in French Pat. No. 1,252,416. In U.S. Pat. No. 2,381,338–Cornthwaite-Scott, it is disclosed that pivalic acid could be vinylated only in the vapor phase since acetylene does not react with the acid in liquid phase. In U.S. Pat. No. 3,455,998-Arpe there is disclosed and claimed an improved process for the production of vinyl esters of carboxylic acids by reacting a carboxylic acid with acetylene, in the liquid phase, at a temperature of from about 200° to about 300° C., in the presence of a zinc salt of a carboxylic acid in combination with a metal-containing Lewis acid. In U.S. Pat. No. 3,285,941 issued Nov. 15, 1966, there is disclosed and claimed a process wherein vinyl esters of carboxylic acids are produced by reaction of acetylene with carboxylic acids in an organic liquid medium containing a zinc salt as catalyst. Generally the organic liquid medium is recovered and recycled to the reaction zone together with the catalyst. When such a process is carried out continuously, i.e., by continuous reaction of acetylene with carboxylic acid, continuous passage of liquid medium through the reaction zone and continuous recirculation of liquid medium to this zone, smooth operation is possible, but generally only at relatively low reaction rates; at higher rates difficulty is encountered in keeping the reaction rate constant at the high level.

It has now been found that this difficulty is overcome and that high reaction rates are uniformly maintained by subjecting the catalyst-containing recycle stream to direct contact with at least a portion of the carboxylic acid to be vinylated before its reintroduction into the reaction zone.

In accordance with the invention vinyl esters of carboxylic acids are produced in a continuous process with substantially improved efficiency, at high reaction rates, by continuous reaction of acetylene with carboxylic acids, in liquid phase, in a reaction zone, at a temperature of from about 150° to about 300° C., in the presence of a liquid reaction medium consisting essentially of an organic solvent containing a zinc salt of a carboxylic acid, continuously withdrawing a portion of the reaction medium from the reaction zone, bringing the withdrawn portion of reaction medium into direct contact with at least a part of the carboxylic acid to be reacted with the acetylene, and thereafter returning the withdrawn portion of the reaction medium to the reaction zone.

The catalyst used in the invention is a zinc salt of a carboxylic acid, which may be any carboxylic acid, but is preferably the same carboxylic acid which is vinylated by reaction with acetylene. The amount of catalyst may be varied rather widely, but catalyst concentrations between about 4 and about 12 percent by weight, calculated as weight of zinc metal on the total weight of the liquid medium, are preferred.

Suitable acids vinylated in the process of the invention comprise broadly the saturated aliphatic monocarboxylic acids, such as propionic, isobutyric, octanoic and stearic acid. Preferred acids are those which contain at least 5 carbon atoms and a tertiary or quaternary carbon atom in the $\alpha$-position with respect to the carboxyl group. Acids of the latter type may be produced in various ways, for example by reacting olefins, such as isobutylene, diisobutylene, propylene trimer and tetramer or cracked olefins having 6 to 8 or 8 to 10 or 12 to 14 or 14 to 18 carbon atoms, with carbon monoxide and water in the presence of acidic catalysts, e.g. phosphoric acid, sulfuric acid or complexes of phosphoric acid, boron trifluoride and water. The invention is of particular interest for the vinylation of the said $\alpha$-branched acids having from 9 to 13 carbon atoms. It is applied with particular advantage to the vinylation of trialkylacetic acids of 9 to 13 carbon atoms.

Good results are obtained with a molar ratio of acetylene to carboxylic acid in the range of about 1:1 to 30:1, preferably from about 1:1 to about 10:1. The temperature in the reaction zone is generally between about 150° and about 300° C., preferably between about 180° and about 260° C. Atmospheric pressure is suitable, although subatmospheric or superatmospheric pressures may be employed.

The concentration of the carboxylic acid in the liquid reaction medium in the reaction zone is advantageously kept extremely low, preferably at or below about 7 percent by weight and more preferably below about 4 percent by weight, calculated on the total weight of the medium. The acid concentration may range as low as about 0.1 percent by weight for example.

The liquid solvent component of the organic reaction medium which contains the catalyst in suspended or dissolved form may be any organic liquid in which the vinyl esters are soluble. Suitable solvents include, for example, the saturated aliphatic hydrocarbons having boiling temperatures above the reaction temperature used, such as the paraffinic, cycloparaffinic or naphthenic hydrocarbons including those having at least 16 carbon atoms, mixtures thereof, spindle oils, medicinal or technical white oils and the like. A particularly suitable class of solvents are the polar organic solvents, for example, carboxylic acid anhydrides, carboxylic acids, aliphatic and aromatic ketones, esters including vinyl esters of carboxylic acids, which esters may be identical with those prepared by the present process, polyphenyl ethers, polyethylene glycol or polypropylene glycol, and the like.

The zinc carboxylate catalyst can be applied together with a metal-containing Lewis acid as cocatalyst. In accordance with the definition given in "Olah, Friedel-Crafts and Related Reactions," Interscience Publishers, 1963, Vol. I, 173 ff., the Lewis acids considered are compounds which can accept an electron pair with formation of a covalent bond. Suitable Lewis acids to be used as cocatalysts are halides, in particular chlorides of beryllium, boron, aluminum, cerium, didymium and the like. Didymium normally consists of a mixture of rare earths, such as lanthanum, cerium, praseodymium, neodymium and minor amounts of gadolinium and ytterbium.

The vinyl esters are separated from the liquid reaction medium by suitable conventional methods, including, for example, evaporation, distillation, fractionation, solvent extraction, etc. Suitable removal of vinyl esters, optionally together with unreacted carboxylic acid, can be effected in the reaction zone, but is advantageously carried out in a separate step during recirculation of the liquid reaction medium. The catalyst-containing liquid residue thereby obtained, which may still contain an appreciable amount of vinyl esters, because complete removal of vinyl esters is not necessary, is then again introduced into the reaction zone.

In accordance with the invention, the catalyst in the liquid reaction medium being recirculated is activated by a treatment consisting of direct contact with carboxylic acid to be vinylated, i.e. the acid to be introduced into the reaction zone, where it is converted to the corresponding vinyl ester by reaction with acetylene. Since this catalyst-activating treatment is employed before the circulating liquid reaction medium is reintroduced into the reaction zone, it is referred to herein as a "pretreatment." Although the pretreatment is in general carried out after removal of the vinyl esters from the reaction medium being recirculated, the invention is not limited to this specific embodiment; the pretreatment can also be effected before any removal of vinyl esters from the recirculating medium; it may be applied to a recirculating stream which is not used for separating vinyl esters therefrom, for example when the esters are distilled directly from the medium in the reaction zone or are removed in a separate recirculation system.

In continuous preparation of vinyl esters with recirculation of catalyst-containing liquid reactions medium, but without the pretreatment of the catalyst, high reaction rates cannot be maintained at a constant level, because at the reaction conditions giving high reaction rates, catalyst in the liquid medium is converted into inactive material. Continuous recirculation of liquid reaction medium to the reaction zone then increases the relative amount of inactive material in the reaction zone, which is of course accompanied by a decrease in reaction rate. The pretreatment reconverts the inactive material into active catalyst. By so doing, the amount of inactive material in the liquid reaction medium reintroduced into the reaction zone is maintained not only at a minimum but at a constant level which, of course, results in uniform activity of the catalyst and in a uniform vinylation reaction rate.

In the pretreatment in accordance with the invention, the inactive catalyst is converted to the active form by reaction with the carboxylic acid to be vinylated.

The temperature of the pretreatment as a rule will be kept at or slightly below the temperatures prevailing in the reaction zone in which the vinylation reaction is carried out, and preferably at about 150° to about 250° C. It should be noted that the rate of conversion of inactive to active catalyst is dependent to some extent on the concentration of carboxylic acid; higher acid concentrations corresponding with higher conversion rates. During the pretreatment, the concentration of the carboxylic acid in the liquid reaction medium is advantageously kept at values which are at least about 50 percent higher, more particularly at least about 200 percent higher than the concentration of the carboxylic acid in the liquid reaction medium in the reaction zone. An acid concentration of from about 1 to about 25 percent, and more particularly from about 8 to about 14 percent by weight of the reaction medium during the pretreatment is satisfactory. Higher ratios may, however, be employed within the scope of the invention.

Although preferred, it is not essential to effect the pretreatment at such conditions that the amount of inactive material in the medium to be introduced into the reaction zone is kept at the lowest possible value; it is permissible to leave a certain amount of inactive material in this medium, provided, however, that this amount does not increase during continuation of the recirculation. This likewise means that it is permissible to subject only part of the recirculation stream to the relevant pretreatment and/or to use only part of the carboxylic acid to be vinylated for the pretreatment, while feeding the remaining part direct to the reaction zone. Thus, for example, the recirculating stream can be split into two separate streams, one of which is pretreated and the other is not. In a preferred embodiment of this invention, at least about 60 w/o of the carboxylic acid to be vinylated and preferably about 100 w/o, is used for the pretreatment, while it is likewise preferred to subject the complete amount of the recirculating stream to the relevant reaction with carboxylic acid.

The vinyl esters obtained may be used as intermediates in the preparation of polymers or copolymers. In particular, the (co)polymers obtained from vinyl esters derived from α-branched carboxylic acids are useful substances which may be applied, inter alia, in emulsion paints, as thickeners, dispersants, as components in alkyd and epoxy resins and as viscosity improvers in lubricating oils. The latter group of copolymers has outstanding properties, in particular excellent chemical stability. It may be added here that the polymerization characteristics of the vinyl esters obtainable with the present novel continuous process are generally improved when effecting this process under conditions at which the concentration of the carboxylic acid in the liquid medium in the reaction zone is maintained above 0.1 w/o, preferably above 0.25 w/o.

The process of this invention and the advantages obtainable therewith are illustrated in the following examples, wherein the acids vinylated are the commercial products "VERSATIC" 10 and "VERSATIC" 911 (the word "VERSATIC" is a registered trademark). "VERSATIC" 10 is a mixture of α-branched carboxylic acids obtained by reacting propylene trimer with carbon monoxide and water in the presence of an acid catalyst. "VERSATIC" 911 is a mixture of α-branched carboxylic acids obtained analogously from a mixture of olefins with from 8 to 10 carbon atoms. Examples I and IV do not illustrate this invention, but serve only for comparison.

EXAMPLE I a. A mixture of α-branched carboxylic acids obtained by reacting propylene trimer with carbon monoxide and water in the presence of an acid catalyst, sold under the trademark "VERSATIC" 10, in admixture with the anhydride thereof and the zinc salt thereof, was placed in a reaction vessel having a volume of 1,000 l. Then "VERSATIC" 10 and acetylene were continuously introduced into the reactor and the continuous recirculation of liquid reaction mixture was started. Unreacted acetylene was continuously vented from and recirculated to the reactor, while the vinyl ester formed was continuously removed from the recirculating stream by evaporation after the concentration of the ester in this stream had grown to a value of 30 w/o. A small part of the recirculating stream was removed to prevent a constant increase in the amount of inert byproducts in the reaction mixture; the resulting loss of catalyst was made up by continuous addition of zinc salt to the reactor. The composition of the mixture in the reactor was continuously kept homogeneous by efficient stirring.

By adjusting the rate at which acetylene and "VERSATIC" 10 were introduced into the reactor and the rate at which the vinyl ester formed was removed from the recirculating liquid mixture, the continuous process could be operated constantly for at least 200 hours at the conditions included in Table I. The rate of production reported therein is the rate at which the vinyl ester prepared is removed from recirculating medium; the rate of recirculation is the rate at which the liquid reaction mixture is withdrawn from the reactor. The given concentration of the catalyst in the liquid reaction mixture corresponds with a zinc content of 6.2 w/o calculated as metal on the total weight of the liquid mixture.

TABLE I

| | |
|---|---|
| Temperature, °C. | 200 |
| Pressure, atm. abs. | 1.1 |
| Volume of reaction mixture, l | 800 |
| Rate of recirculation, l/l | 800 |
| Feed rate, kg./h. | |
| "Versatic" 10 | 40 |
| Acetylene | 14 |
| Composition of reaction mixture, %w | |
| Vinyl ester | 30 |
| Anhydride | 16 |
| Zinc salt | 43 |
| "Versatic" 10 | 2.5 |
| Inert material | 8.5 |
| Rate of production, kg./h. | 45.8 | b. The continuous run described in experiment (a) was followed by an attempt to effect continuous operation at a higher reaction rate. To this purpose the rates at which the acid and acetylene were introduced into the reactor were increased to 63 and 25 kg./h., respectively. The other reaction conditions reported in Table I, including the concentration of the vinyl ester in the liquid mixture in the reactor, were maintained at the values given, by adjusting the rate at which the vinyl ester formed was removed from the recirculating stream. It appeared that after a period of 3 hours, the reaction rate was only 65 percent of the initial high value, the decrease being calculated from the reduction in acetylene consumption.

EXAMPLE II

The run described in Example ((b) was continued while maintaining the feed rates. However, instead of introducing the total amount of the carboxylic acid directly into the vinylation reactor, part of this acid was now supplied to a stirred reaction vessel with a volume of 350 l. Likewise, the complete recirculating stream was passed through the latter vessel before being introduced into the vinylation reactor. The mixture withdrawn from this vessel, which contained activated catalyst and carboxylic acid, was then supplied to the reactor via a feed line having an internal volume of less than 0.8 1. so that, as compared with the residence time applied in the 350-1. vessel, the residence time of the liquid mixture in this feed line was negligible.

The volume of the liquid mixture determining the residence time in the pretreatment vessel could be regulated by adjusting the outlet of this vessel. The concentration of the carboxylic acid in this vessel could be controlled by varying the ratio of the rates at which the acid was fed to the reactor and to the pretreatment vessel.

When selecting the temperature in the pretreatment vessel at 180° C., the acid concentration at 10 percent by weight and the residence time at 4.5 minutes, the reaction rate increased from 65 percent to 100 percent of the initial high value applied when starting Experiment I(b) in a period of 2 hours and that by maintaining the conditions of the pretreatment, the continuous process could be operated constantly at the said high reaction rate for a period of more than 1,000 hours.

EXAMPLE III

While maintaining the conditions prevailing in the vinylation reactor as described in Example II, the residence time and the acid concentration used in the pretreatment vessel were varied in order to find for each concentration the minimum values at which the process could be operated at constant reaction rate. The data found, as well as preferred residence times, are included in Table II.

TABLE II

| Concentration, %w | Residence Time, min. Minimum | Preferred |
|---|---|---|
| 3 | 7.5 | 10–25 |
| 10 | 3.0 | 4–10 |
| 20 | 1.5 | 2.5–6.5 |
| 30 | 0.6 | 1.5–4 |

These figures apply to a pretreatment temperature of 200° C.; at temperatures of 20° C. higher and lower, the data are about 20 percent lower and higher, respectively.

EXAMPLE IV a. When operating as in the experiment described in Example Ia, it appeared that "VERSATIC" 911 could be continuously vinylated at a constant reaction rate for at least 200 hours, under the reaction conditions reported in Table III.

TABLE III

| | |
|---|---|
| Temperature, °C. | 190 |
| Pressure, atm. abs. | 1.1 |
| Volume of reaction mixture, l | 850 |
| Rate of recirculation, l/h. | 800 |
| Feed rate, kg./h. | |
| "Versatic" 911 | 84 |
| Acetylene | 26 |
| Composition of reaction mixture, %w | |
| Vinyl ester | 22 |
| Anhydride | 10 |
| Zinc salt | 34 |
| Inert material | 30.5 |
| "Versatic" 911 | 3.5 |
| Rate of production, kg./h. | 95 | b. The run described in experiment (a) was continued at a higher reaction rate by increasing the feed rates of "VERSATIC" 911 and acetylene to 122 and 38 kg./h., respectively, while leaving the other reaction conditions, including the concentrations of the vinyl ester in the liquid mixture in the vinylation reactor, unchanged. After a period of 4 hours the reaction rate appeared to be only 40 percent of the initial high value.

EXAMPLE V

Subsequent to experiment (b) of Example IV, the run was continued as described in Example II, i.e., with pretreatment of the catalyst with "VERSATIC" 911 in the stirred reaction vessel having a volume of 350 1. When effecting this pretreatment at a temperature of 180° C., a residence time of 5 minutes and an acid concentration of 10 w/o, the reaction rate regained its initial high value after a period of 2.2 hours. While maintaining the reaction conditions of the pretreatment, the continuous process could be operated at constant reaction rate for more than 1,000 hours.

We claim as our invention:

1. The continuous process for the production of vinyl esters of α-branched saturated aliphatic hydrocarbon carboxylic acids of from 9 to 13 carbon atoms which consists essentially of reacting acetylene with said carboxylic acids, in liquid phase, in a reaction zone, at a temperature of from about 150° to about 300° C., in the presence of a liquid reaction medium which consists essentially of an organic solvent containing a zinc salt of said carboxylic acid, continuously withdrawing a portion of said reaction medium from said reaction zone, bringing said withdrawn portion of said reaction medium into direct contact at a temperature of from 150° to 250° C. with at least a part of said carboxylic acid to be reacted with said acetylene, and thereafter returning said withdrawn portion of said reaction medium to said reaction zone.

2. The process in accordance with claim 1 wherein the concentration of said carboxylic acid in said reaction medium in the reaction zone is maintained below about .7 percent by weight.

3. The process in accordance with claim 2 wherein the concentration of said zinc salt in said reaction medium is between about 4 and 12 percent by weight.

4. The process in accordance with claim 3 wherein said zinc salt is the zinc salt of the carboxylic acid reacted with acetylene in the process.

5. The process in accordance with claim 3 wherein said organic solvent is the acid an hydride corresponding to said carboxylic acid reacted with the acetylene.

6. The process in accordance with claim 1 wherein the concentration of said carboxylic acid in said reaction medium in the reaction zone is maintained below about 4 percent by weight.